United States Patent
Surani et al.

(10) Patent No.: US 11,409,796 B1
(45) Date of Patent: Aug. 9, 2022

(54) GENERATIONAL DATABASES FOR MANAGING TIME SERIES DATA

(71) Applicant: Amazon Technologies, Inc., Seattle, WA (US)

(72) Inventors: Mihir Sadruddin Surani, Seattle, WA (US); Roberto Pentz De Faria, Sammamish, WA (US); Mohit Gupta, Seattle, WA (US); Yuxuan Liu, Kirkland, WA (US); Leslie Johann Lamprecht, Seattle, WA (US); John Merrill Phillips, Seattle, WA (US); John David Dunagan, Redmond, WA (US); Malcolm Featonby, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/140,243

(22) Filed: Sep. 24, 2018

(51) Int. Cl.
*G06F 16/00* (2019.01)
*G06F 16/901* (2019.01)
*G06F 21/62* (2013.01)
*G06F 16/23* (2019.01)
*G06F 16/907* (2019.01)

(52) U.S. Cl.
CPC ............ *G06F 16/901* (2019.01); *G06F 16/23* (2019.01); *G06F 16/907* (2019.01); *G06F 21/6227* (2013.01)

(58) Field of Classification Search
None
See application file for complete search history.

(56) References Cited

U.S. PATENT DOCUMENTS

| | | | |
|---|---|---|---|
| 10,007,690 B2 * | 6/2018 | Finkler | G06F 16/2272 |
| 10,331,657 B1 * | 6/2019 | Cole | G06F 16/2365 |
| 2014/0032506 A1 * | 1/2014 | Hoey | G06F 16/215 707/691 |
| 2016/0092484 A1 * | 3/2016 | Finkler | G06F 16/258 707/715 |
| 2016/0224532 A1 * | 8/2016 | Miller | G06F 17/30572 |
| 2016/0328432 A1 * | 11/2016 | Raghunathan | G06F 16/2264 |
| 2018/0089188 A1 * | 3/2018 | Kharisma | G06F 3/0481 |
| 2018/0089289 A1 * | 3/2018 | Zhang | G06F 16/25 |
| 2019/0155802 A1 * | 5/2019 | Miller | G06F 16/235 |
| 2019/0155803 A1 * | 5/2019 | Miller | G06F 16/2372 |

* cited by examiner

Primary Examiner — Farhan M Syed
(74) Attorney, Agent, or Firm — Knobbe Martens Olson & Bear LLP

(57) ABSTRACT

A database service that receives and manages time series data into a set of generational data tables. The database service generates a set of generational data tables configured to receive a subset of time series data. Each generational data table is created with an initial set of access parameters that facilitates the receipt of incoming time series data. Thereafter, the database service creates additional generational data tables to receive the continuous received time series data and then modifies the access parameters of the previously created data table, such as for read only rights.

20 Claims, 7 Drawing Sheets

GENERATIONAL DATABASES FOR MANAGING TIME SERIES DATA

BACKGROUND

Generally described, computing devices and communication networks can be utilized to exchange data or information. In a common application, a computing device can request content from another computing device via the communication network. For example, a user at a personal computing device can utilize a browser application to request a content page (e.g., a network page, a Web page, etc.) or access a service from a server computing device via the network (e.g., the Internet). In such embodiments, the user computing device can be referred to as a client computing device and the server computing device can be referred to as a content provider or service provider.

In some applications, service provider can generate or receive data as part of the interaction with a plurality of user devices or other network-based devices. The service providers may wish to store and maintain the data and make the stored data accessible at a later date. In such applications, the service provider may utilize a network-based database service that can be utilized to receive data via the communication network. The network-based database service can further provide requested data via the communication network. Depending on the application and source, the amount of data provided to the database service can be substantially large.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
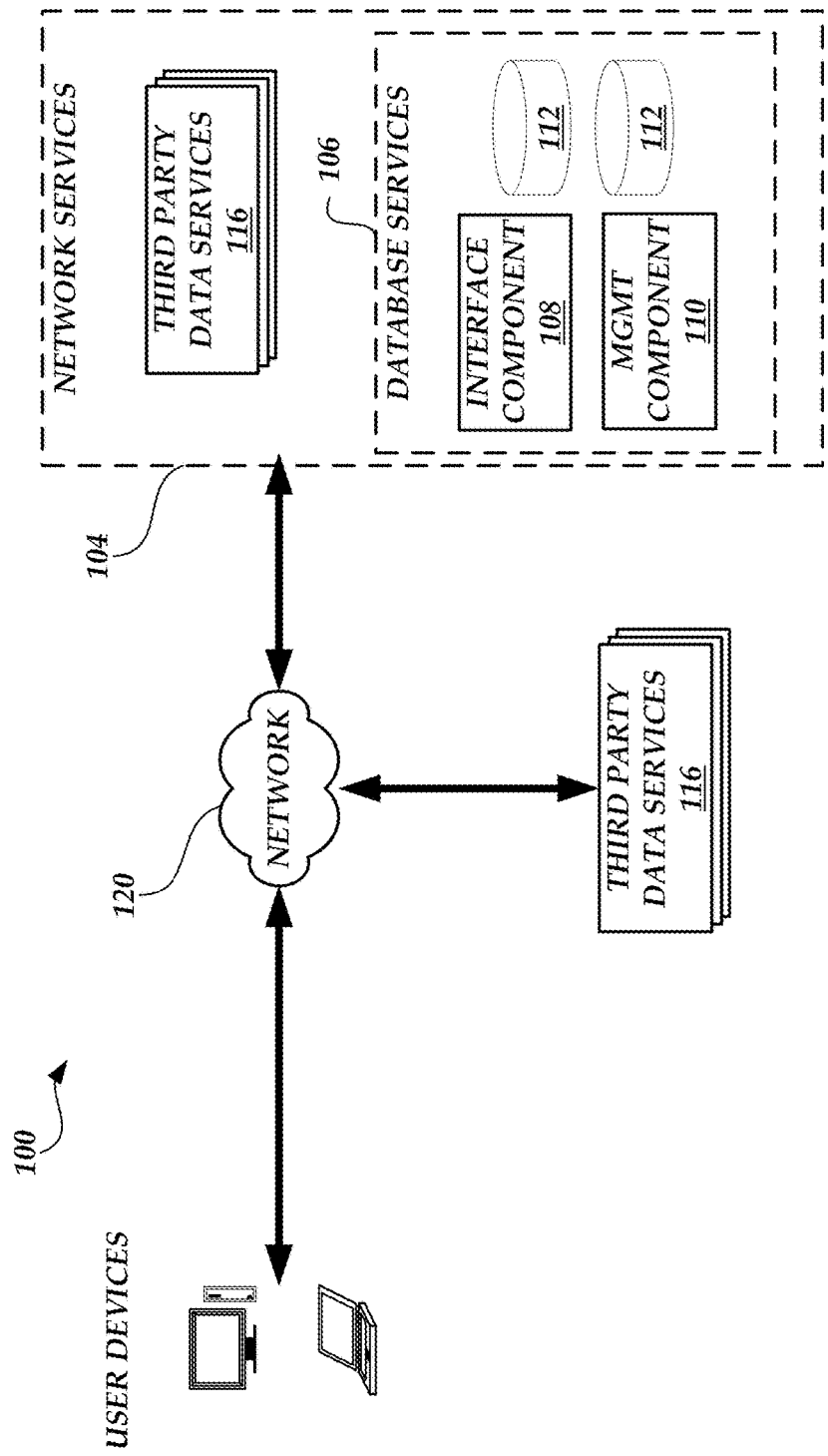
FIG. 1 is a block diagram of a network environment that includes one or more user devices, one or more third-party data services, a network services system, and a database service in accordance with some embodiments.

Generally described, service providers or content providers can provide or host services that collect or generate data for storage, which can generally be referred to as a data service. With regard to service providers that engage in commerce, the service provider can host one or more services or network resources that interact with user computing devices or other service providers for purposes of facilitating transactions. As part of the interaction or transaction, one or more components of the services/network resources can generate data that the service may wish to store, such as using a network-based database service. Depending on the type of service provider, interaction or transaction, the volume of data transmitted to the database service provider can be large.

In some specific embodiments, data services can provide the database service with time series data. Generally described, time series data corresponds to a series of data points or data values that are associated with timing information and ordered according to the timing information. For example, time series data can correspond to a sequential series of measurements of one or more values/attributes at predetermined time intervals. In another example, time series data can correspond to transaction data corresponding to a sequence of one or more values/attributes associated with timing information of when the transaction generating the value/attribute occurs or is collected. Time series data can encompass a variety of data types including numeric data, symbolic data, and the like. Time series data can be recalled by the data services or other third parties to facilitate a variety of data analysis, such as forecasting, regression analysis, and the like.

To process received data, database service providers, such as network-based database service providers, can contract with various data services based on the volume of data received and maintained. For example, a database service may specify different pricing tiers or performance/control parameters based on the number of records maintained by the database service or the size of the data maintained by the database service provider. Additionally, database service providers can further contract/manage with data services based on the type of access or access parameters provided to the data service. For example, a database service may have different pricing tiers or control parameters based on the access parameters of the stored data, such as the ability to read data, write data, data throughput rates, and the like. In this example, access parameters granting a data service both reading and writing access would likely be of a greater cost or be associated with larger controls. In still a further example, a database service provider can further combine pricing/control parameters based on the volume of data and the type of access parameters.

As applied to managing time series data, a database service provider can receive and store received time series data in a database table or data table. For example, the database table can be organized according to the timing information and one or more values/representations corresponding to the timing information. Typically, the database table provided by the database provider would need to be associated with access parameters that facilitate writing the time series data to the database table as it is received by the database service provider and reading access for recalling/transmitting the stored time series data. In the event of a hardware or network failures, the database service provider will at least temporarily not be able to provide any portion of the time series data. If the data table has not been archived, there is the potential for a complete data loss. Alternatively, even if the data table has been archived, if the data table is large, restoration of the data table may take additional time and require additional processing resources.

In certain embodiments, because time series data is associated with timing information (e.g., a time of collection), once individual time series data is written to a record of the database table, the data service will unlikely need to make further writes to the specific record (absent a need to correct or amend a record) and will only require read access for later recall. Given that time series data corresponds to a sequence of values, the data service will simply write additional time series data as data records to the data table. As the volume of time series data written to a data table grows, especially in high data volume embodiments, a large portion of a data table becomes fixed time series data that will only be read. However, the database service provider must continue to associate greater access parameters (e.g., "full access parameters") to allow for further additions of the new incoming time series data. Such greater access parameters can result in higher operational and resources costs for the database provider to maintain sufficient database resources to host the growing data table, including additional computing device resources, such as processing resources, memory resources and communication network resources. Additionally, for large portions of the time series data, the data services will continue to subscribe to access parameters that may not be needed. Accordingly, traditional approaches to maintaining time series data in a database table are deficient for both database service providers and data services.

To address at least in part some of the above-described deficiencies associated with traditional database data intake and management techniques, aspects of the present application correspond to a method and system for managing time series data. More specifically, a service includes a management component generates a set of data tables configured to individually receive and maintain subsets of a set or sequence of time series data. Each individual data table can be referred to as a generational data table that maintains portions of the sequence of time series data. The portion of the sequence, e.g., the "generation", can be defined in terms of the timing information encompassed by the time series data (from a starting time to an ending time), in terms of a threshold amount of time series data, or a combination (e.g., the lesser of a threshold amount of time or a threshold amount of data). Illustratively, the configuration of the size of the generational table can be specified by a system administrator associated with the data service utilizing the database service, by the database service based on selected performance parameters or established sizing parameters, or dynamically determined based on the anticipated size or use of the time series data.

Illustratively, the management component of the database service initially creates or causes to be created a generational data table for receipt of time series data. The created data table is configured or associated with initial access parameters that include access parameters most appropriate for the receipt of the time series data, including at least a write parameter for allowing addition of records to the data table and a read parameter for reading previously written data records. The initial access parameters can also include various input or output control parameters that may facilitate the intake of time series data, such as a higher data throughput control as data is being transmitted to the database service provider. In some embodiments, the generational data table is further configured to be a size that will be less than the anticipated sequence of time series data or that falls within specified costs/control parameters. The generational data table can be associated with meta-data that helps identify the time series data intended to be stored in the table (e.g., timing information ranges, sources, etc.).

After the creation of the generational data table, the database service provider can receive time series data, such as via an application program interface ("API"). The incoming time series data can be directed via an interface component to an appropriately configured data table, such as by utilizing the meta-data. Additionally, during the collection of the time series data, the management component of the database service can determine that one or more additional generational data tables should be generated. For example, the management component may monitor for an expiration of time, receipt of a threshold amount of time series data, receipt of a command/instruction, and the like. Based on the determination, the management component creates or causes to be created additional generational data tables for receipt of incoming time series data. Similar to the initially created data table, the additional data table(s) are configured or associated with initial access parameters that include access parameters most appropriate for the receipt of the time series data, including at least a write parameter for allowing addition of records to the data table and a read parameter for reading previously written data records. The initial access parameters can also include various input or output control parameters that may facilitate the intake of time series data, such as a higher data throughput control as data is being transmitted to the database service provider.

After the creation of the additional generational data table, the interface component of the database service provider will eventually direct time series data to the appropriately configured additional data tables. In one embodiment, once the additional data tables begin receiving data, the previously created data tables will not receive further new time series data. The database service provider may initiate a hold period in the event that one or more of the received time series data may modified, replaced or deleted (e.g., correcting an error or supplementing a value). After the hold period (or if no hold period is implemented), the management component of the database provider then modifies the access parameters of the previously created data table to remove access parameters that are no longer required. For example, the management component can remove the write access parameter of the previously created table, which will no longer receive incoming time series data. In another example, the management component can change or alter control parameters associated with the physical machines hosting the data table, such as modifying the input/output control parameters that might be optimized to facilitate reading the stored time series data (e.g., data throughput rates configured for read access only). Still further, in some embodiments, the database service can also modify the access parameters of relatively older generational data tables or generational data tables not being accessed to an archival state or deletion state.

The process of creating additional generational data tables and modifying access parameters for previously created generational data can be implemented continuously over the course of the receipt of the time series data. With reference to the previous deficiencies associated with single data tables, as the volume of time series data written received by the database service provider grows, especially in high data volume embodiments, only a small portion of the generational data tables have full access parameters (e.g., reading and writing access parameters). The remaining portions of the generational data tables have been managed to have a reduced set of access parameters (e.g., read only access parameters). Still further, the processing resource required to host or maintain the remaining portions of the generational data tables can be reduced or optimized in a manner for more limited, updated access parameters (including deletion of older or unaccessed generational data tables). Accordingly, the database service provider only needs to support greater access parameters to a much smaller portion of the total set of time series data and optimize for more limited access parameters for a greater portion of the total time series data. This approach can result in operational and resources savings and efficiencies for the database provider. Even further, because the time series data is distributed over a plurality of generational data tables, the database service can provide greater redundancy and error recovery in that that loss of any individual generational data table would not result in unavailability of other portions of the time series data. Additionally, the data services will only subscribe to full access parameters for a relatively small portion of the transmitted time series data. This approach can further result in operational and resource savings for the data services in being able to have time series data efficiently stored and efficiently recalled.

In accordance with one or more aspects of the present application, the operations of the database service provider will be described with regard to the management of time series data. However, in other embodiments, the database service can implement at least aspects of the functionality associated with the present application on data that may not be considered time series data. Accordingly, while the present application will be illustratively described with regard to time series data, such discussion is illustrative in nature and should be construed as limiting or exhaustive of all possible applications of one or more aspects of the present application.

FIG. 1 illustrates a general network environment 100 for the generation, processing and storing of data. Illustratively, network environment 100 will be described with regard to the generation, processing and storage of time series data. The network environment 100 includes a plurality of devices 102 utilized by individual users, generally referred to as user computing devices, configured to interact with one or more aspects of the network environment component or request time series data stored by components of the network environment 100.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

Network 120 may be any wired network, wireless network, or combination thereof. In addition, the networks 120 may be a personal area network, local area network, wide area network, cable network, fiber network, satellite network, cellular telephone network, data network or combination thereof. In the example environment of FIG. 1, network 120 is a global area network ("GAN"), such as the Internet. Protocols and components for communicating via the other aforementioned types of communication networks are well known to those skilled in the art of computer communications and thus, need not be described in more detail herein. While the user device 102 is depicted as having a single connection to the network 120, individual components of the user devices 102 may be connected to the network 120 at disparate points. Accordingly, communication times and capabilities may vary between the components of FIG. 1.

The network environment 100 also includes a set of network services, generally referred to as network service 104 or network services 104, that represents a set of network services made available by one or more service providers via a communication network, such as communication network 120. Illustratively, to facilitate the receipt and processing of time series data, the network services 104 can include database services 106. Database services 106 corresponds to a network-based database service hosted by a service provider. For purposes of illustrating aspects of the present application, the database service 106 includes an interface component 108 for receiving time series data (or other data) from data services. Although illustrated as a single component, the interface component 108 logically represents one or more computing devices (physical or virtual) that are configured to receive time series data from data services. For example, the interface component may correspond to any number of physical or virtual computing devices configured in geographically distinct areas. The database services further include a management component 110 that is configured, at least in part, to generate (or cause to be generated) generational data tables and to manage the access parameters associated with instantiated generational data tables. Illustrative components and operation of a management component 110 will be described with regard to FIG. 3.

The database services 106 can include a plurality of data stores 112 or database nodes for maintaining time series data in accordance with one or more aspects of the present application. FIG. 1 illustrates multiple data stores 112 for receiving and maintaining time series data. The data stores are logically represented together but may be implemented in a distributed manner, such as via geographically distinct areas. Additionally, although represented as a single data stores 112, individual data stores or multiple data stores may be implemented utilizing a number of physical computing devices, virtual computing devices, or combination thereof. As will be described in detail below, the data stores will maintain generational data tables for time series data. Although referenced as a single data tables, the data stores may have multiple copies of the data tables for performance and redundancy purposes. For purposes of illustration, the nodes of the database services 106 may have different resources, such as processing resources, memory resources, network resources, or virtualized versions thereof, that can be optimized for the different access parameters as described herein. However, any particular data store 112 or node can be modified or configured to host varying access parameters of the generational data tables.

It will be appreciated by those skilled in the art that the network services 104 may have fewer or greater components than are illustrated in FIG. 1. Thus, the depiction of the network services 104 in FIG. 1 should be taken as illustrative.

The network environment 100 can include a plurality of data services, such third party data services 116, for collecting or generating time series data to be stored in the database service 106. The third party data services 116 may include one or more servers or components that correspond to any one of a variety of functions such as hosting commerce via network 120, providing content via network 120, measuring (directly or indirectly) events and the like. As illustrated in FIG. 1, the third party data services 116 may be hosted as part of the network services 104, such as utilizing virtual machine resources. In some embodiments, the third party data services 116 may be hosted independent of the network services 104, such as in a stand-alone communication network and be connected to the network service(s) via communication network 120. Still further, one or more combinations or various combinations of partially hosted third-party data services 116 may include components associated with the network service 104 and additional independent networks. One skilled in the relevant art will appreciate that reference to third-party data services is intended solely to illustrate the transmission of time series data to network services and that affiliation of a data service to the network services is not required or prohibited.

Figure 2:
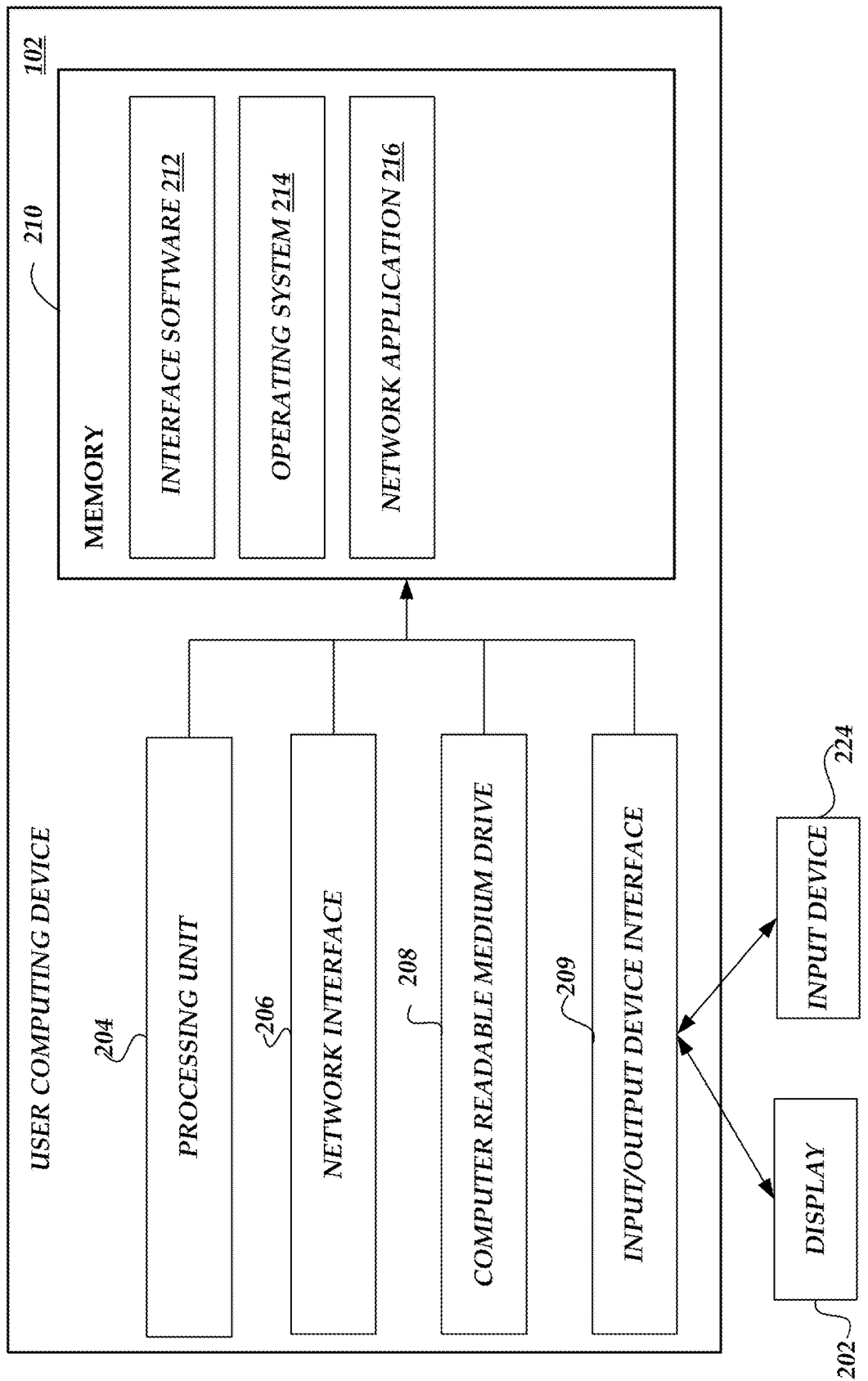
FIG. 2 is a block diagram illustrative of components of user device for interacting with data services or database service in accordance with some embodiments.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 120 of FIG. 1, and the network services 104. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for transmitting data from the user device 102. In some embodiments, the memory 210 may include one or more additional software applications or components that are configured, at least in part, to configure the generation of the generational data tables as described herein. For example, network application 217 may be configure to request and receive time series data from the database services 116 or otherwise transmit configuration information utilized to establish the parameters of the generational data tables.

Figure 3:
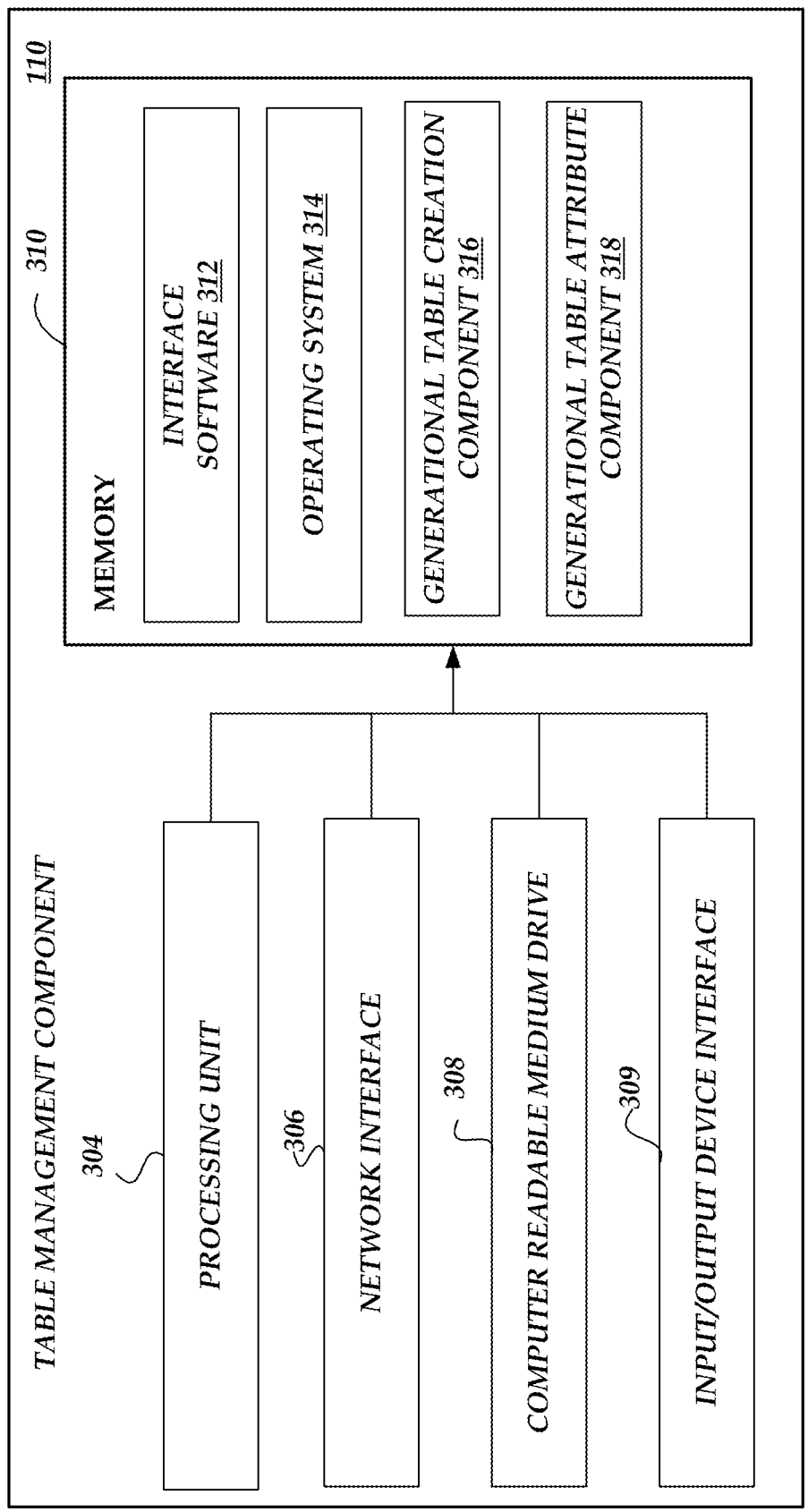
FIG. 3 is a block diagram illustrative of components of a management component of a database service for managing the generation-based data tables utilized to maintain time series data at a database service in accordance with some embodiments.

FIG. 3 depicts one embodiment of an architecture of an illustrative computing device for implementing various aspects of the management of the data tables utilized to store time series data (or other data) in accordance with aspects of the present application. The computing device 300 can be a part of the database services 106, such as a management component 110. Alternatively, the computing device may a stand-alone device independent of the database services 106.

The general architecture of the computing device 300 depicted in FIG. 3 includes an arrangement of computer hardware and software components that may be used to implement aspects of the present disclosure. As illustrated, the computing device 300 includes a processing unit 304, a network interface 306, a computer readable medium drive 308, an input/output device interface 309, all of which may communicate with one another by way of a communication bus. The components of the computing device 300 may be physical hardware components or implemented in a virtualized environment.

The network interface 306 may provide connectivity to one or more networks or computing systems, such as the network 120 of FIG. 1. The processing unit 304 may thus receive information and instructions from other computing systems or services via a network. The processing unit 304 may also communicate to and from memory 310 and further provide output information for an optional display via the input/output device interface 409. In some embodiments, the computing device 300 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the computing device 300. The memory 310 may further include computer program instructions and other information for implementing aspects of the present disclosure. For example, in one embodiment, the memory 310 includes interface software 312 for receiving and processing content streams. Memory 310 includes a generational data table creation component 316 for generating generational data tables for receiving and storing time series data received from data services 116. The memory 310 further includes a generational table attribute component 318 for managing access parameters for created generational data tables, such as identifying an initial set of access parameters and updated access parameters, as described herein.

As specified above, in one embodiment, the computing device 300 illustrated in FIG. 3 can be implemented as physical computing devices or virtualized computing devices in a computing network. In another embodiment, the computing device 300 may be implemented as logical components in a virtual computing network in which the functionality of the computing device 300 is implemented by an underlying substrate network of physical computing devices. Thus, aspects of the present application should not be limited to interpretation requiring a physical, virtual or logical embodiment unless specifically indicated as such.

Figure 4A:
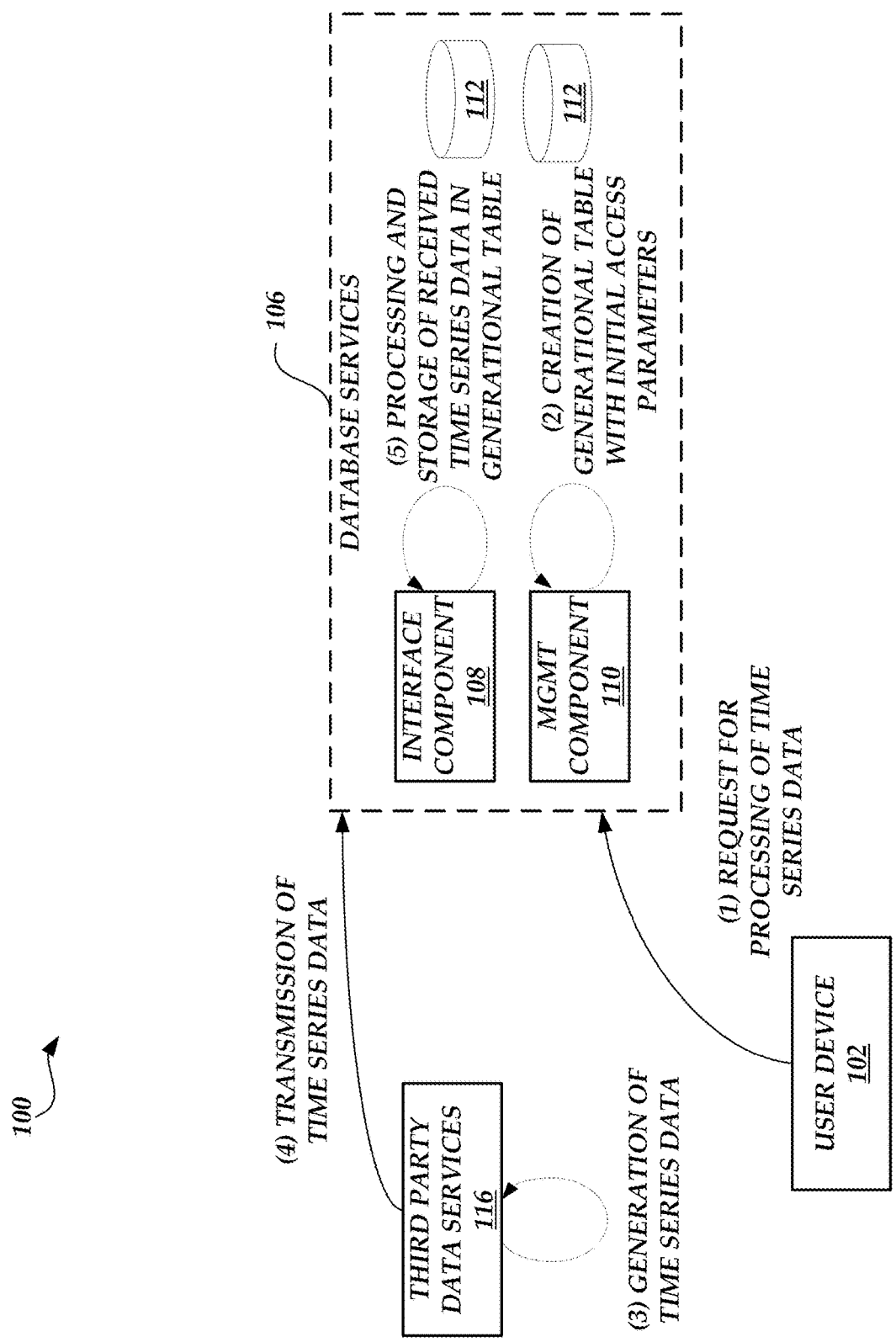
FIGS. 4A-4B are block diagrams of the network environment of FIG. 1 illustrating the generation and management of access attributes on generational data tables storing time series data in accordance with some embodiments.
Figure 4B:
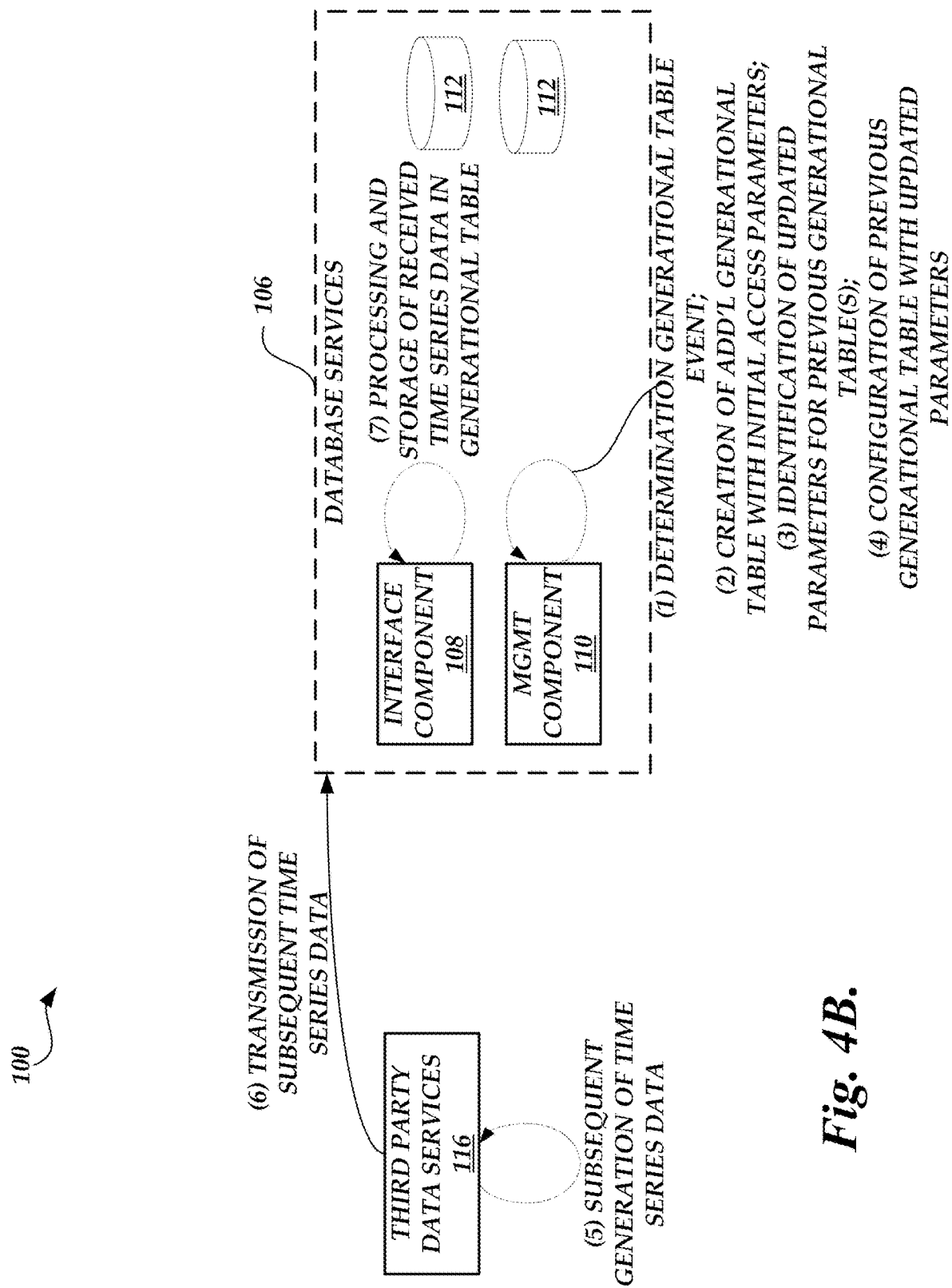

Turning now to FIGS. 4A and 4B, an illustrative interaction for the configuration of generational data tables and managing of access parameters over time will be described. For purposes of illustration, it is assumed that an illustrative third-party data service 116 has engaged to provide data, such as time series data, to the database service 106. At (1), management component 110 receives a request or configuration from the user device 102 to process time series data (or other data). Such a request can establish at least a portion of the access control parameters or otherwise specify financial or performance metrics for the storage and retrieval of the time series data. For example, the request can include a specification of the size thresholds or timing information that be utilized to establish individual sizes of the generational data tables (as described herein). In another example, the request can include a specification of archival and deletion criteria for managing the updated access parameters for at least a portion of the generational data tables. Still further, the request can include a specification of performance criteria or characteristics related to performance of the nodes hosting the generational data tables and varying access parameters.

At (2), the management component 110 of the database service 106 initially creates or causes to be created one or more generational data tables for receipt of time series data. The created data table is configured or associated with initial access parameters that include access parameters most appropriate for the receipt of the time series data. In one embodiment, the initial access parameters include at least a write parameter for allowing addition of records to the generational data table and a read parameter for reading previously written data records. The initial access parameters can also include various input or output control parameters that may facilitate the intake of time series data, such as a higher data throughput control as data is being transmitted to the database service provider. In another embodiment, the initial access parameters can further specific control parameters such as the resource requirements of the physical or virtual computing devices hosting the generational data table, such as processing resource requirements, memory requirements, network requirements, etc. The control parameters can be optimized for the access parameters, such as to facilitate read access and write access to the generational table. In some embodiments, the generational data table is further configured to be a size that will be less than the anticipated sequence of time series data or that falls within specified costs/control parameters. The specification of the size and performance of the generational tables can be provided via the user device 102 (e.g., a system administrator for the data service), selected by the database service 106 based on established categories/classes of generational data table configurations, or dynamically determined based on the anticipated size of the incoming time series data or intended use of the time series data (e.g., anticipating a large number of read requests). The management component 110 can further generate or associate meta-data with the generational data table that helps identify the time series data intended to be stored in the table (e.g., timing information ranges, information sources, data size limits, etc.).

After the creation of the generational data table, at (3), the third-party data service 116 generates time series data and at (4), the database service 106 can receive time series data, such as via an API. The incoming time series data can be directed via an interface component to an appropriately configured data table, such as by utilizing the meta-data. As described above, the third-party data service 116 can generate time series data based on a variety of functions or tasks, such as commerce network resources, content generation or production network resources, and the like. At (5), the interface component 108 can process the incoming time series data and cause the incoming data to be stored in the created generational data table. In some embodiments, if multiple data tables are utilized, the interface component can direct incoming time series data to an appropriate generational data table. For example, the interface component 108 can evaluate timing information, source information, data types, etc. that may influence or direct which table will receive the time series data.

With reference now to FIG. 4B, during the collection of the time series data, at (1), the management component 110 of the database service 106 can determine that one or more additional generational data tables should be generated. Illustratively, the determination or trigger for generating additional generational table can be referred to as a generational table event. For example, the management component 110 may monitor for an expiration of time, receipt of a threshold amount of time series data in a current table, receipt of a command/instruction, and the like. The generational event criteria may be specified by the user computing device 102, derived from the configuration of the generational data tables (e.g., based on the selected size of the generational data tables), or otherwise selected by the database service 106.

At (2), based on the determination, the management component creates or causes to be created additional generational data tables for receipt of incoming time series data. Similar to the initially created data table, the additional data table(s) are configured or associated with initial access parameters that include access parameters most appropriate for the receipt of the time series data, including at least a write parameter for allowing addition of records to the data table and a read parameter for reading previously written data records. The initial access parameters can also include various input or output control parameters that may facilitate the intake of time series data, such as a higher data throughput control as data is being transmitted to the database service provider.

In one embodiment, the database service 106 may optionally initiate a hold period in the event that one or more of the received time series data may modified, replaced or deleted (e.g., correcting an error or supplementing a value). After the hold period (or if no hold period is implemented), at (3), the management component 110 of the database service 106 identifies updated access parameters of the previously created data table to remove access parameters that are no longer required. For example, the management component 110 can remove the write access parameter of the previously created table, which will no longer receive incoming time series data. In another example, the management component 100 can change or alter the processing controls that are reflective of, or optimized for, reading the stored time series data (e.g., data throughput rates configured for read access only or modification of the processing resources allocated). Still further, for some subsets of the generational data tables, the management component 110 can determine that the access parameters can be further modified to an archival status or deletion status. Such updated access parameters may be selected for generational data tables that have a time series data above a threshold time (e.g., older generational data tables) or for generational data tables that have not been accessed for a threshold amount of time or have not been access a threshold number of times. At (4), the management component 110 causes the changing of the access parameters for the previously configured generational table. As described above, in some embodiments, causing the changing of the access parameters can include execution of the modification at a host node 112. Alternatively, causing a changing of the access parameter may include a migration of the generational data table to a different host node (or virtual machine) configured with the updated access parameters.

At (5), the third-party data service 116 continues to collect or generate time series data and transmits the time series data to the data service 106. After the creation of the additional generational data table, at (7), the interface component of the database service provider will eventually direct time series data to the appropriately configured additional data tables. In one embodiment, once the additional data tables begin receiving data, the previously created data tables will not receive further new time series data. The process of creating additional generational data tables and modifying access parameters for previously created generational data can be implemented continuously over the course of the receipt of the time series data.

Figure 5:
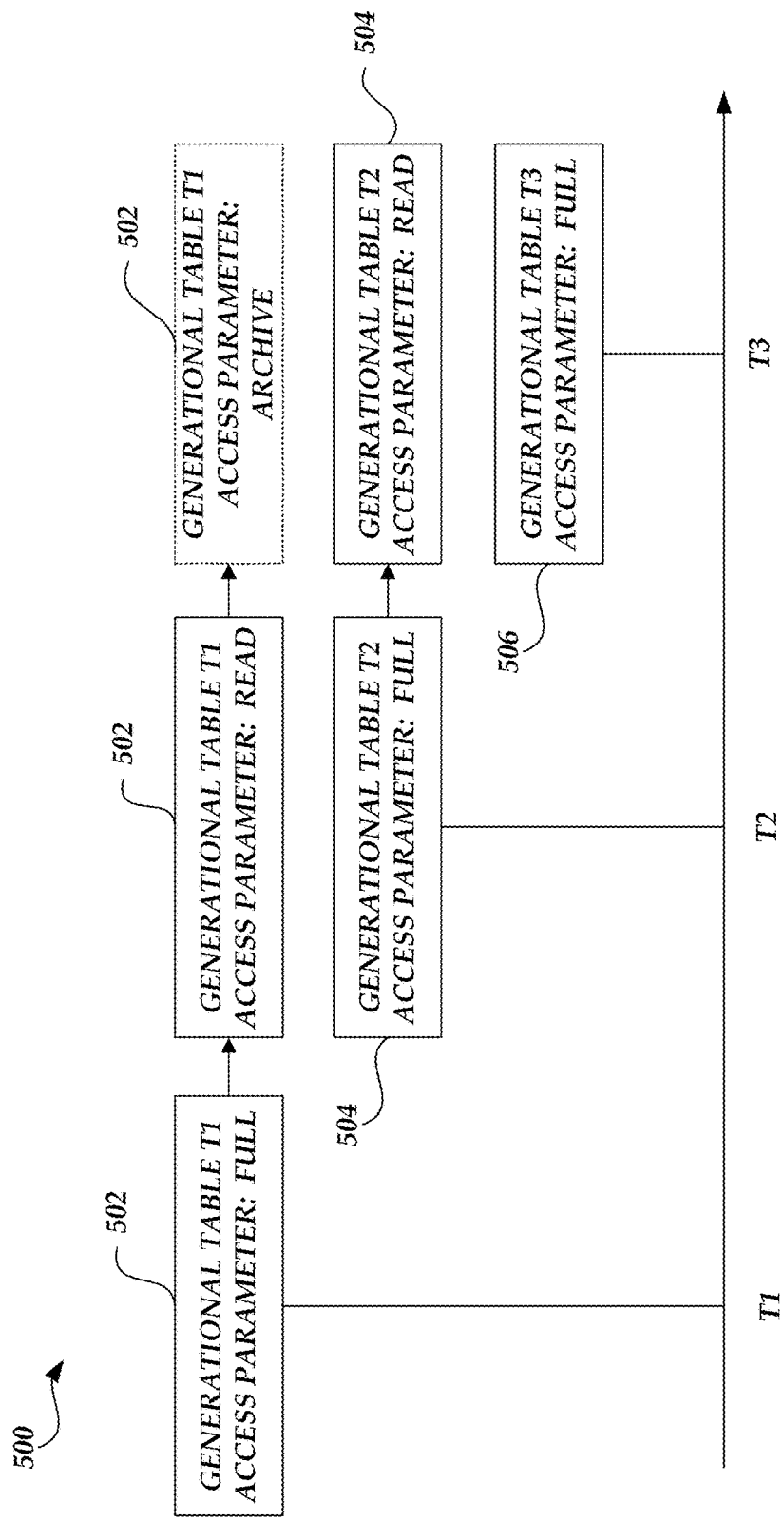
FIG. 5 is a block diagram of illustrative of a set of generational tables storing time series data in accordance with some embodiments.

FIG. 5 is a block diagram of illustrative of a set of generational tables 500 storing time series data. More specifically, FIG. 5 illustrates the generation of a set of generational tables and modifying access parameters over a time period, T1-T3. At time T1, at least one generational table 502 is created or exists having full access rights (or some higher version of access rights). Such "full access" rights can include, but is not limited to, read access and write access as has been described. During the time period between T1-T2, generational table 502 receives and stores time series data provided by a data service 116.

For purposes of illustration, at time T2, a generational table event has occurred or is detected by the database service 106. In response, generational table 504 is created having full access rights (substantially similar to the full access rights previously configured for generational table 502). Generational table 504 begins receiving and storing time series data provided by the data service 116. Additionally, the database service 106 no longer writes to generational table 502. Accordingly, as described herein, the database service 106 modifies the access parameters of the generational table 502, such as read only access rights (and possible additional control parameters).

For purposes of illustration, at time T3, a second or subsequent generational table event has occurred or is detected by the database service 106. In response, generational table 506 is created having full access rights (substantially similar to the full access rights previously configured for generational table 502 and generational table 504). Generational table 506 begins receiving and storing time series data provided by the data service 116. Additionally, the database service 106 no longer writes to generational table 504. Accordingly, as described herein, the database service 106 modifies the access parameters of the generational table 504, such as read only access rights (and possible additional control parameters). Additionally, as illustrated in FIG. 5, the database service 106 can make additional changes to the access parameters of generational table 502, such as modifying the access parameters such that generational table 502 to an archived status or deleted status. As discussed above, further modifications of the access parameters to generational data tables, such as via archival or deletion, can further facilitate the total amount of data and processing resources required to maintain the total amount of data. Accordingly, FIG. 5 illustrates the process of creating additional generational data tables and modifying access parameters for previously created generational data can be implemented continuously over the course of the receipt of the time series data.

Figure 6:
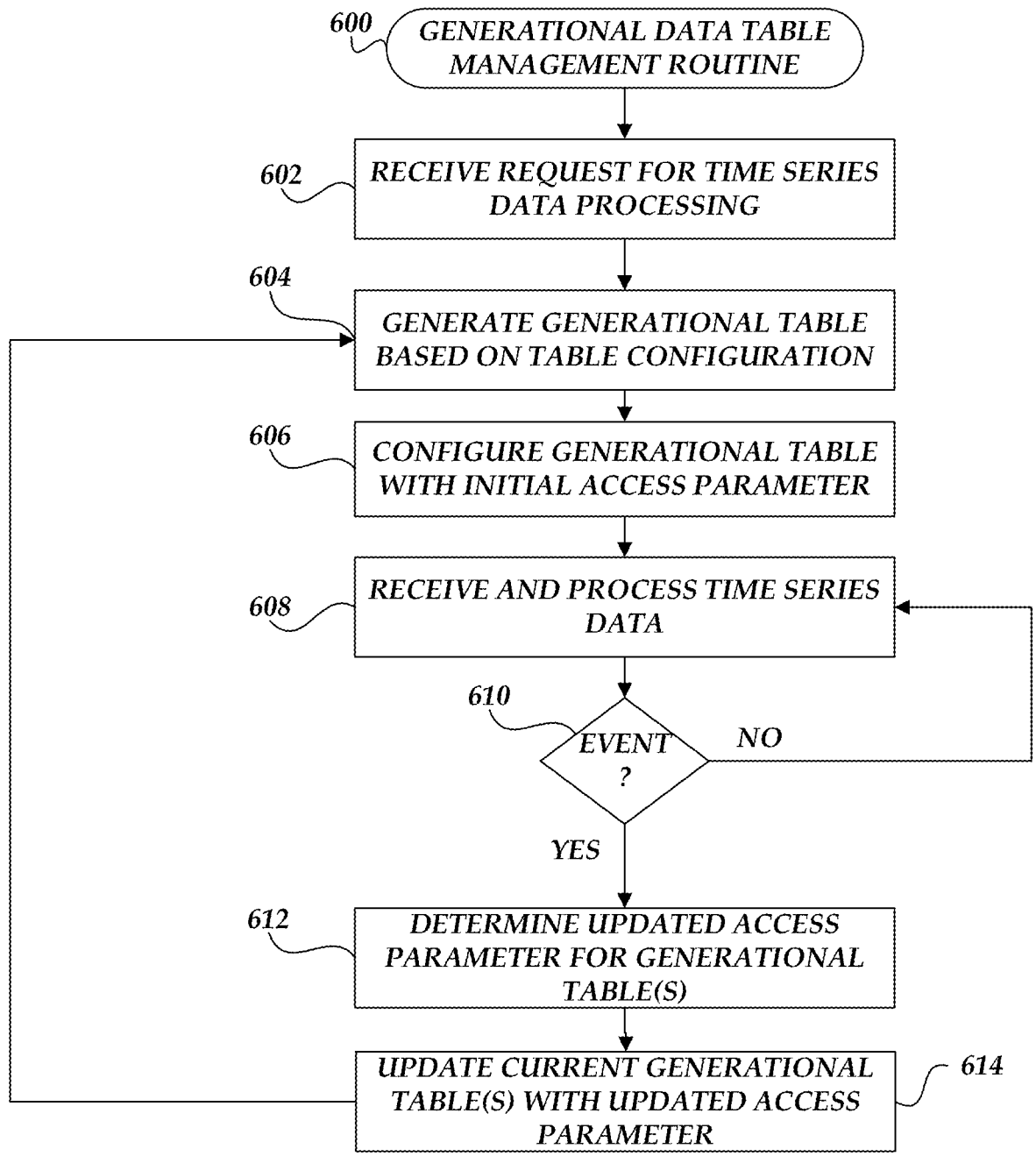
FIG. 6 is a flow diagram illustrative of a generational data table management routine implemented by a database service in accordance with some embodiments.

Turning now to FIG. 6, a flow diagram 600 illustrative of a generational data table management routine 600 implemented by the database service 106 will be described. Illustratively, routine 600 can be implemented upon configuration of the database service 106 to receive time series data from a third-party data service 116. At block 602, the management component 110 receives a request or configuration from the third-party data service 116 to process time series data (or other data). Such a request can establish at least a portion of the access control parameters or otherwise specify financial or performance metrics for the storage and retrieval of the time series data. For example, the request can include a specification of the size thresholds or timing information that be utilized to establish individual sizes of the generational data tables (as described herein). In another example, the request can include a specification of archival and deletion criteria for managing the updated access parameters for at least a portion of the generational data tables. Still further, the request can include a specification of performance criteria or characteristics related to performance of the nodes hosting the generational data tables and varying access parameters. Even further, the request can include information or criteria utilized to determine generational events.

At block 604, the management component 110 of the database service 106 initially creates or causes to be created a generational data table (or set of tables) for receipt of time series data. At block 606, the management component 110 configures or associates the created data table with initial access parameters that include access parameters most appropriate for the receipt of the time series data. In one embodiment, the initial access parameters include at least a write parameter for allowing addition of records to the generational data table and a read parameter for reading previously written data records. The initial access parameters can also include various input or output control parameters that may facilitate the intake of time series data, such as a higher data throughput control as data is being transmitted to the database service provider. In another embodiment, the initial access parameters can further specific resource requirements, such as processing resource requirements, memory requirements, etc. that facilitate read access and write access to the generational table. In some embodiments, the generational data table is further configured to be a size that will be less than the anticipated sequence of time series data or that falls within specified costs/control parameters. The management component 110 can further generate or associate meta-data with the generational data table that helps identify the time series data intended to be stored in the table (e.g., timing information ranges, information sources, data size limits, etc.).

At block 608, the database service 106 can receive time series data, such as via an API. The incoming time series data can be directed via an interface component to an appropriately configured data table, such as by utilizing the meta-data. As described above, the third-party data service 116 can generate time series data based on a variety of functions or tasks, such as commerce network resources, content generation or production network resources, and the like. As described above, the interface component 108 can process the incoming time series data and cause the incoming data to be stored in the created generational data table. In some embodiments, if multiple data tables are utilized, the interface component can direct incoming time series data to an appropriate generational data table. For example, the interface component 108 can evaluate timing information, source information, data types, etc. that may influence or direct which table will receive the time series data.

With continued reference to FIG. 6, during the collection of the time series data, at decision block 610, the management component 110 of the database service 106 can determine that one or more additional generational data tables should be generated. Illustratively, the determination or trigger for generating additional generational table can be referred to as a generational table event. For example, the management component 110 may monitor for an expiration of time, receipt of a threshold amount of time series data in a current table, receipt of a command/instruction, and the like. If the event has not been detected, the routine 600 returns to block 608 to continue to receive the incoming time series data.

Alternative, if at decision block 610, a generational table event is detected, at block 612, the management component 110 of the database service 106 identifies updated access parameters of the previously created data table to modify access parameters based on the configuration selected when the database service was configured. The modified access parameters may be associated with access parameters that are no longer required or no longer optimized for the generational table. In one embodiment, the database service 106 may optionally initiate a hold period in the event that one or more of the received time series data may modified, replaced or deleted (e.g., correcting an error or supplementing a value). After the hold period (or if no hold period is implemented), the generational data tables can be configured. For example, the management component 110 can remove the write access parameter of the previously created table, which will no longer receive incoming time series data. In another example, the management component 100 can change or alter the control parameters that might selected or optimized to correspond to other updated access parameters (e.g., data throughput rates configured for read access only or memory caching to increase the speed of processing requests). Still further, for some subsets of the generational data tables, the management component 110 can determine that the access parameters can be further modified to an archival status or deletion status. Such updated access parameters may be selected for generational data tables that have a time series data above a threshold time (e.g., older generational data tables) or for generational data tables that have not been accessed for a threshold amount of time or have not been access a threshold number of times.

In some embodiments, the management component 110 may only be required to modify the access parameters of a "current" generational table as previous generational tables will likely have modified access parameters. Additionally, the modification of the access parameters is not necessarily required to match an increased or specified access parameter as part of the initial set of access parameters. For example, an initial access parameter may not specify any form of processing resource control parameters, but the modified access control parameter may specific a maximum processing resource control parameter. In other embodiments, the management component 110 may make additional changes to the access parameters of previously existing generational tables. For example, the management component 110 may make additional changes to the allocated resources, such as lowers processing resources or memory resources. In this example, the management component 110 can consider a relative age of the generational table such that processing resources can be reduced in proportion to the age of the generational table. In version of this example, the management component 110 can consider a relative use of the generational table such that processing resources can be reduced in proportion to the number of times a previously configured generational table has been accessed. The adjustment of the process resources can be achieved by applying preset configurations/levels or applying a percentage reduction in allocated resources in which the percentage reduction is attributed to age, use or similar characteristic. Still further, for some subsets of the generational data tables, the management component 110 can determine that the access parameters can be further modified to an archival status or deletion status. Such updated access parameters may be selected for generational data tables that have a time series data above a threshold time (e.g., older generational data tables) or for generational data tables that have not been accessed for a threshold amount of time or have not been access a threshold number of times.

At block 614, the management component 110 causes the changing of the access parameters for the previously configured generational table(s). As described above, in some embodiments, causing the changing of the access parameters can include execution of the modification at a host node 112. Alternatively, causing a changing of the access parameter may include a migration of the generational data table to a different host node (or virtual machine) configured with the updated access parameters.

Once the existing generational table access parameters have been adjusted or changed at block 614, the routine 600 then returns to block 604, where the management component 110 creates or causes to be created additional generational data tables for receipt of incoming time series data. Similar to the initially created data table, the additional data table(s) are configured or associated with initial access parameters that include access parameters most appropriate for the receipt of the time series data, including at least a write parameter for allowing addition of records to the data table and a read parameter for reading previously written data records. The initial access parameters can also include various input or output control parameters that may facilitate the intake of time series data, such as a higher data throughput control as data is being transmitted to the database service provider. The additional created generational tables may have the same initial access parameters and be configured similarly, such as in size. Alternatively, the management component 110 can receive configuration information that modifies subsequently generated generational tables, such as based on performance, cost incurred, or via a subsequent user configuration command. For example, subsequent generational data tables may have different sizes based on the volume of time series data that is received. Or, control parameters from the initial access parameter configuration may be adjusted in order to meet service level demands or the like.

The process of creating additional generational data tables and modifying access parameters for previously created generational data can be implemented continuously over the course of the receipt of the time series data.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage time series data comprising:
one or more computing devices associated with a management component of a database service, wherein the management component is configured to:
create one or more first generational data tables for receiving time series data provided by one or more data services, wherein the one or more first generational data tables are configured to maintain a first subset of the time series data provided by the one or more data services;
configure the one or more first generational data tables with a first access parameter indicating read access and write access, and wherein the first access parameter further indicates a data throughput rate reserved for the one or more first generational data tables to receive the time series data provided by the one or more data services;
determine that a generational event associated with receipt of time series data has occurred at the one or more first generational data tables;
responsive to determining that the generational event has occurred, create one or more second generational data tables for receiving the time series data provided by the one or more data services, wherein the one or more second generational data tables are configured to maintain a second subset of the time series data provided by the one or more data services and wherein the one or more second generational data tables are configured with a second access parameter indicating read access and write access, and wherein the second access parameter further indicates a data throughput rate reserved for the one or more second generational data tables to receive the time series data provided by the one or more data services; and further responsive to determining that the generational event has occurred, modify the first access parameter of the one or more first generational data tables to maintain the read access, to revoke the write access parameters, and to decrease the data throughput rate reserved for the one or more first generational data tables to receive the time series data provided by the one or more data services; and one or more computing devices associated with an interface component of a database service, wherein the interface component is configured to:

receive the time series data from the one or more data services;

identify at least one generational data table of the one or more first generational data tables or the one or more second generational data tables for receiving the time series data based on the first and second access parameters.

2. The system of claim 1, wherein the generational event includes at least one of an expiration of time or receipt of a threshold amount of time series data.

3. The system of claim 1, wherein at least one of the first subset of the time series data or the second subset of the time series data is based on a range of timing information in the time series data.

4. The system of claim 1, wherein at least one of the first subset of the time series data or the second subset of the time series data is based on a maximum amount of time series data in a generational data table.

5. A computer-implemented method to manage processing of data in a database service comprising:

creating one or more first generational data tables for receiving data provided by one or more data services, wherein the one or more first generational data tables are configured to maintain a first subset of the data;

configuring the one or more first generational data tables with a first access parameter indicating read access and write access, and wherein the first access parameter further indicates a data throughput rate reserved for the one or more first generational data tables to receive the data provided by the one or more data services;

determining that a generational event associated with receipt of the data has occurred at the one or more first generational data tables;

responsive to determining that the generational event has occurred, creating one or more second generational data tables for receiving the data provided by the one or more data services, wherein the one or more second generational data tables are configured to maintain a second subset of the data, wherein the one or more second generational data tables are configured with a second access parameter and wherein the second access parameter indicates a data throughput rate reserved for the one or more second generational data tables to receive the data provided by the one or more data services;

further responsive to determining the generational event has occurred, mainlining the read access for the first access parameter of the one or more first generational data tables;

revoking the write access from the first access parameter of the one or more first generational data tables;

modifying the first access parameter to decrease the data throughput rate reserved for the one or more first generational data tables to receive the data provided by the one or more data services; and identifying at least one generational data table of the one or more first generational tables or the one or more second generational tables for receiving the data based on the first access parameter and the second access parameter.

6. The computer-implemented method of claim 5, the second access parameter indicates at least a read access.

7. The computer-implemented method of claim 5, wherein the first access parameter further indicates at least one of a processing resource configuration, memory resource configuration or network resource configuration.

8. The computer-implemented method of claim 5 further comprising modifying the second access parameter to modify the data throughput rate reserved for the one or more second generational data tables.

9. The computer-implemented method of claim 5 further comprising modifying the first access parameter to reduce at least one of a processing resource configuration, memory resource configuration or network resource configuration.

10. The computer-implemented method of claim 5, wherein the data provided by the one or more data services corresponds to time series data.

11. The computer-implemented method of claim 10, wherein the generational event includes at least one of an expiration of time or receipt of a threshold amount of time series data.

12. The computer-implemented method of claim 10, wherein at least one of the first subset of the data and the second subset of the data is based on a range of timing information in the time series data or a maximum amount of time series data in a generational data table.

13. The computer-implemented method of claim 5 further comprising receiving a request from a user for a collection of the data.

14. The computer-implemented method of claim 13, wherein request from the user includes a specification of at least criteria for determining a subset of time series data, criteria for determining the generational event, or information for determining at least one of the first access parameter or second access parameter.

15. A computer-implemented method to manage data received at a database service comprising:

storing data provided by one or more data services in one or more generational data tables, wherein a first generational table of the one or more generational data tables are configured to maintain a first subset of the data;

configuring the one or more first generational data tables with a first access parameter indicating write access, and wherein the first access parameter further indicates a data throughput rate reserved for one or more the first generational data tables to receive the data provided by the one or more data services;

determining that a generational event associated with receipt of the data has occurred at the one or more generational data tables;

responsive to determining that the generational event has occurred, removing the write access from the first access parameter, and modifying the first access parameter to reduce the data throughput rate reserved for the one or more first generational data tables to receive the time series data provided by the one or more data services; and further responsive to determining that the generational event has occurred, identifying a second generational data table of the one or more generational tables for receiving the time series data, wherein the one or more second generational data tables is configured with a second access parameter including a write access, and wherein the second access parameter indicates a data throughput rate reserved for the one or more second generational data tables to receive the data provided by the one or more data services.

16. The computer-implemented method of claim 15 further comprising creating one or more additional generational data tables for receiving the data provided by the one or more data services, wherein the one or more additional generational data tables are configured to maintain a subset of data and wherein the generational data tables are configured with an initial access parameter.

17. The computer-implemented method of claim 15, wherein the second access parameter includes at least a read access for the one or more second generational data table.

18. The computer-implemented method of claim 15, wherein the first access parameter further indicates a read access for the one or more first generational data tables.

19. The computer-implemented method of claim 15, wherein the data includes time series data.

20. The computer-implemented method of claim 15, wherein the first access parameter includes at least an archival status.

* * * * *